W. C. GEER.
PNEUMATIC TIRE.
APPLICATION FILED OCT. 7, 1916.
1,214,670.
Patented Feb. 6, 1917.
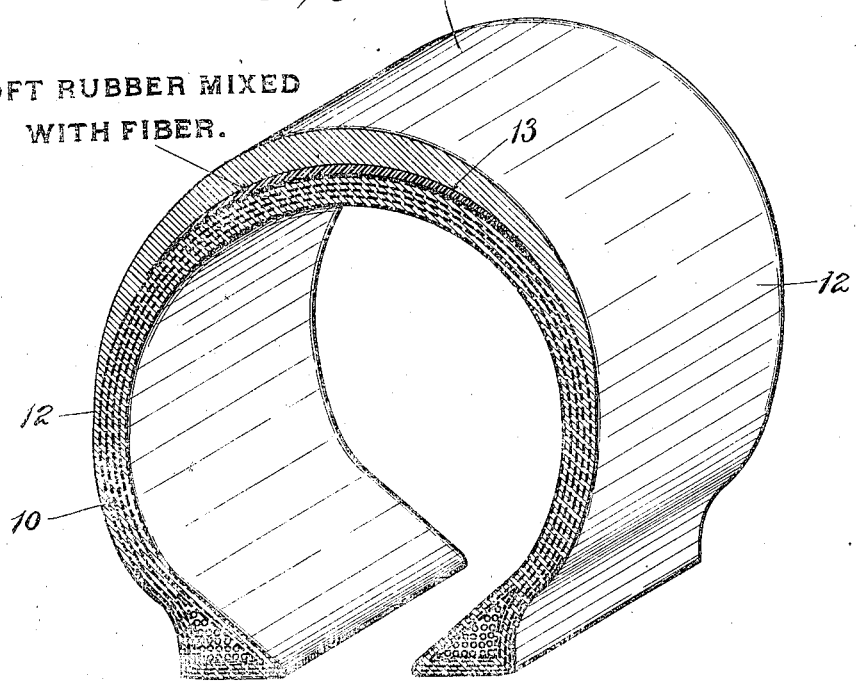
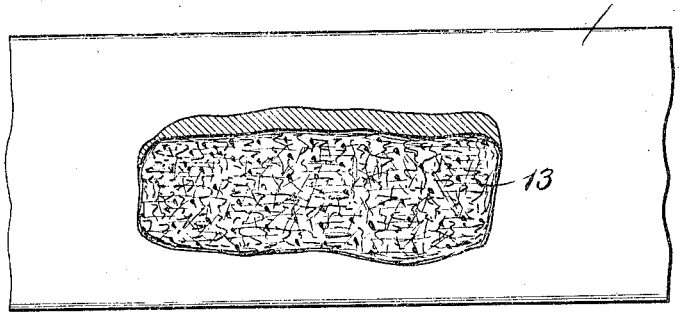
INVENTOR.
Wm. C. Geer.
BY Robert M Pierson
ATTORNEY

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

PNEUMATIC TIRE.

1,214,670.

Specification of Letters Patent.

Patented Feb. 6, 1917.

Application filed October 7, 1916. Serial No. 124,275.

*To all whom it may concern:*

Be it known that I, WILLIAM C. GEER, a citizen of the United States, residing at Akron, in the county of Summit and State of Ohio, have invented certain new and useful Improvements in Pneumatic Tires, of which the following is a specification.

This invention relates to the construction of pneumatic tires and especially tire casings used on motor vehicles, and it has special reference to the material used on the inner side of the tread of the tire, adjacent to the carcass.

Specifically, my invention involves the employment of a breaker strip composed principally of a mixture of rubber and shreds of vegetable fiber such, for example, as ground-up cotton fabric, or other suitable loose or unorganized fibrous material.

Of the accompanying drawings, Figure 1 is a perspective sectional view of a portion of a pneumatic tire-casing provided with my improved breaker strip. Fig. 2 is a plan view with a portion of the tread broken away to expose the breaker strip.

In the drawings, 10 is the carcass (which may be of any suitable construction), 11 is the rubber tread or wearing-surface, and 12, 12 are the rubber side-strips merging with the tread.

13 is the breaker strip forming virtually a part of the rubber tread upon the inner side of the latter adjacent to the outer layer of fabric in the carcass. This strip is composed principally or wholly of vulcanized soft rubber and ground-up cotton fabric or other suitable short-length fiber, the fiber being conveniently incorporated with the rubber on the heated rolls of an ordinary mixing mill, and the resulting material calendered or sheeted and cut into strips of the desired width. The parts of the tire are vulcanized together as usual. In Fig. 2 the surface of the breaker strip is shown conventionally in order to emphasize the presence of the loose or unorganized fibers. The actual material resembles an ordinary piece of compounded rubber, but with a somewhat felt-like appearance due to the presence of the fiber. By the use of this material in place of the ordinary breaker strip or strips of rubberized woven fabric, I obtain better adhesion between the breaker strip and the tread-rubber and carcass respectively, reduce the cost of manufacture, and diminish the tendency of the tire wall to break, or of the tread-rubber to separate from the carcass, at and just beyond or outside of the edges of the breaker strip. A strip of this material performs in a satisfactory manner the principal functions of a fabric breaker strip by counteracting the tendency of the tread rubber to elongate in service relatively to the carcass, and by distributing over the adjacent surface of the carcass the force of any localized blows received by the inflated tire.

I claim:

A pneumatic tire comprising a carcass and a rubber tread thereon having on its inner side adjacent to the carcass a breaker strip composed of soft rubber mixed with shredded or ground-up fiber, the whole being vulcanized.

In testimony whereof I have hereunto set my hand this fifth day of October 1916.

WILLIAM C. GEER.